United States Patent [19]

Pavlovsky

[11] 4,121,817
[45] Oct. 24, 1978

[54] ARRANGEMENT FOR CLAMPING WORKPIECES

[76] Inventor: Rudolf Pavlovsky, Plattenweg 53, CH-8200 Schaffhausen, Switzerland

[21] Appl. No.: 835,324

[22] Filed: Sep. 21, 1977

[30] Foreign Application Priority Data

Oct. 27, 1976 [CH] Switzerland ............ 13522/76

[51] Int. Cl.$^2$ ............................................. B23G 3/00
[52] U.S. Cl. ....................................... 269/296; 269/309; 269/321 A
[58] Field of Search .................. 269/53, 309–314, 269/296, 321 A

[56] References Cited

U.S. PATENT DOCUMENTS

| 2,621,807 | 12/1952 | Rendich | 269/321 A X |
| 3,175,820 | 3/1965 | Schiler | 269/321 A |

Primary Examiner—Robert C. Watson
Attorney, Agent, or Firm—Roylance, Abrams, Berdo & Farley

[57] ABSTRACT

A support arrangement to cooperate with a clamp for holding workpieces of irregular shape wherein a horizontal support plate has holes arranged in orthogonal rows and columns. Workpiece support members of various heights have bottom pegs insertable into the holes to support a workpiece so that it can be clamped from above. An embodiment having a specific matrix of round and elongated holes is disclosed. Support members having two pegs and adjustable heights are also disclosed.

7 Claims, 4 Drawing Figures

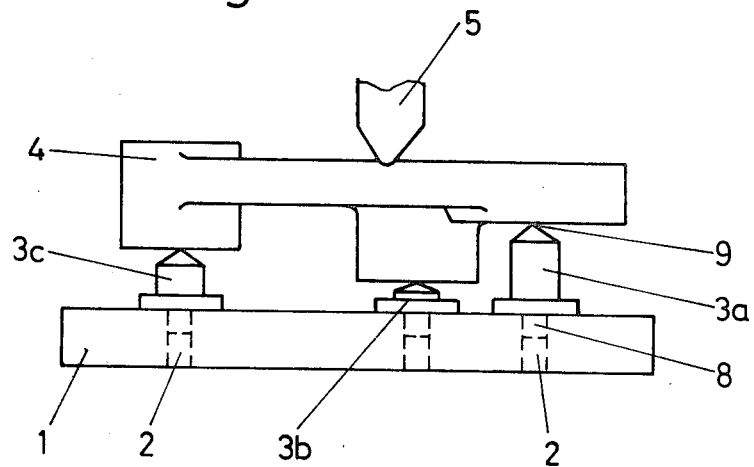
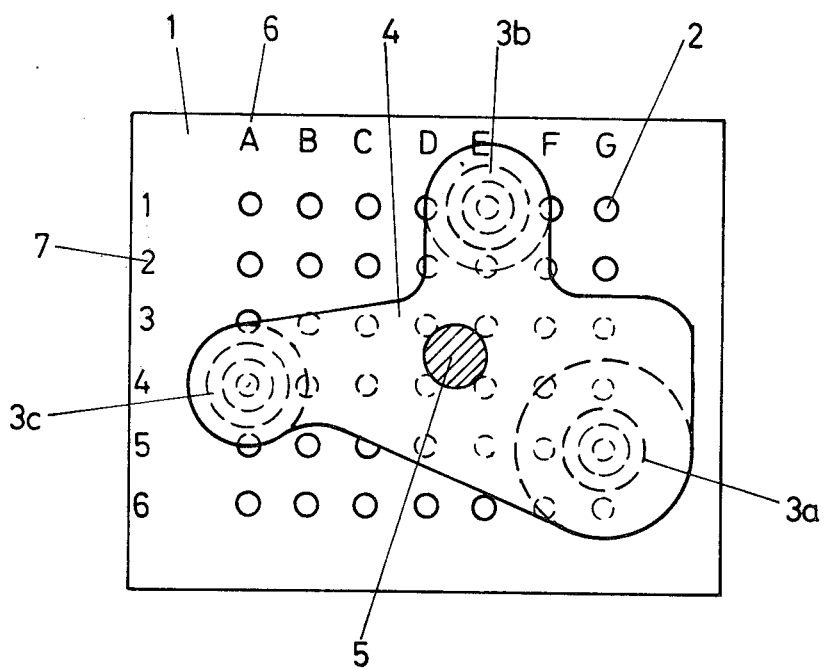

4,121,817

ARRANGEMENT FOR CLAMPING WORKPIECES

This invention relates to an arrangement for holding workpieces and, particularly, to an apparatus for supporting irregularly-shaped workpieces on a platform so that they can be clamped thereto.

BACKGROUND OF THE INVENTION

As is well known, it is necessary to firmly clamp workpieces on machine tools of various kinds so that they can be machined, ground, or otherwise shaped. In some such devices, it is common practice to support the workpieces on members which are designed to support specific workpieces, particularly where the workpieces themselves have an irregular lower surface. Thus, supporting devices are produced to accompany specific workpieces and are therefore unchangeably adapted to support the specific workpieces with which they are associated. This requires that different support devices are needed for different workpieces, and the costs of production and storage of the support devices imposes a disproportionately high load on the total production cost of the workpieces, particularly when it develops that a relatively small number of each differently shaped workpiece is to be produced.

A more flexible approach in common use is to clamp the individual workpieces on clamping tables of machine tools of various kinds, such as milling machines, wherein clamping shoes are longitudinally adjustable in slots having the shape of an inverted T, the undersurfaces of the workpiece being caused to rest on the upper surfaces of the clamping table on individually adapted or movable loose supports. While this is a usable approach, the process of clamping each workpiece requires a long adjusting time and the procedure is suitable only for the finishing of single pieces or relatively small numbers of pieces.

Yet another approach, which has similar disadvantages, is disclosed in British Pat. No. 237,996, wherein clamping elements can be variably disposed in a plate having threaded holes.

BRIEF DESCRIPTION OF THE INVENTION

An object of the present invention is to provide a support apparatus for clamping workpieces wherein the support point can be simply and reproducibly located and wherein the time required to change from one workpiece to another is very short, even though the surfaces of the workpiece to be supported lie in different planes.

A further object is to provide a clamping support apparatus wherein a large number of reproducible supporting points is available.

Briefly described, the invention includes, in an apparatus for supporting workpieces of various shapes on a platform for clamping with a clamping shoe, the improvement wherein the platform comprises a substantially planar horizontal plate having means defining a plurality of apertures passing therethrough in a predetermined array, the apparatus including a plurality of workpiece support members each having a peg insertable into a selected one of the apertures, downwardly facing shoulder means for resting on the plate adjacent the selected aperture, and an upwardly facing support portion for contacting and supporting a portion of the workpiece.

In order that the manner in which the foregoing and other objects are attained in accordance with the invention can be understood in detail, paticularly advantageous embodiments thereof will be described with reference to the accompanying drawings, which form a part of this specification, and wherein:

FIG. 1 is a front elevation of a support and clamping arrangement in accordance with the invention;

FIG. 2 is a plan view, in partial section, of the apparatus of FIG. 1;

DETAILED DESCRIPTION OF THE INVENTION

Figure 3:
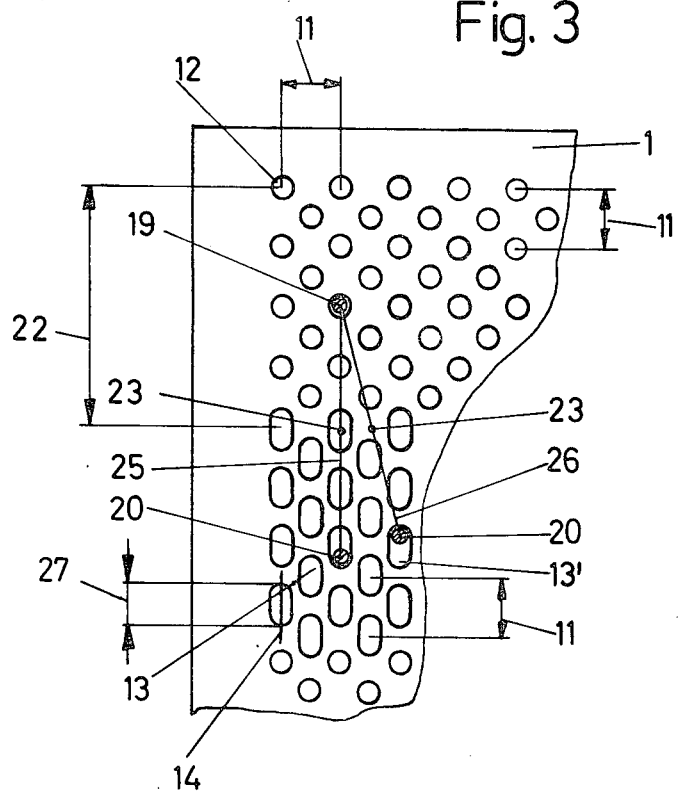
FIG. 3 is a partial plan view of an apertured platform in accordance with a further embodiment of the invvention.

Referring first to FIGS. 1 and 2, it will be seen that the apparatus includes a platform which is a substantially planar plate 1 having a plurality of apertures 2 disposed therein in a predetermined array. As seen in FIG. 2, the array consists of rows and columns of circular holes the centers of which lie along orthogonally disposed lines. The term "row" will be used herein to refer to a sequence of apertures extending horizontally across the drawing, while the term "column" will be used to refer to a sequence of apertures lying vertically in the drawing, although it will be recognized that these terms are so employed for convenience in reference only. It will also be recognized that the platform 1 would normally lie in a substantially horizontal plane but that deviation from the horizontal is of no particular consequence and, in some machines, the platform could lie in a plane deviating substantially from true horizontal.

The apparatus includes workpiece support members 3a, 3b and 3c having upwardly facing support portions on which the workpiece 4 rests. A clamping shoe 5 presses downwardly on an upper portion of the workpiece, the clamping shoe itself being conventional in nature and forming no specific part of the present invention.

As previously indicated, plate 1 has round holds 2 which are disposed in rows and columns and are uniformly spaced apart. The supports 3a–c for the workpiece have downwardly extending pegs 8 which can be inserted in any of the holes, the pegs extending downwardly from flat bottom surfaces of the support members which form shoulder means for resting on the upper surface of the plate adjacent the holes. The workpiece support members can easily be provided in a large variety of heights so that they can be selected in accordance with the thicknesses and variations in planes of the workpiece which can, therefore, be of any irregular shape. As shown in the figures, the support members can be placed so that they form a three-point support for the workpiece. The clamping shoe can then be disposed so that it presses down on the upper surface of workpiece 4 as nearly as possible to the center of gravity of the surface defined by the three support points. As previously indicated, the supports 3 can be provided with a variety of heights to accommodate the variation between the levels of the supported surfaces of the workpiece or else the the support members can be provided in an adjustable form as will be described in connection with FIG. 4.

The upwardly facing support portions of each support member are advantageously formed in a cone shape with a slightly rounded point, the included angle of the cone thereof being between about 90° and 120°. For this purpose, the included conic angle is intended to refer to the angle between the lines of intersection of the cone and a plane passing through the axis of the cone. Preferably, the conic angle is selected to be about 90° which provides an adherence coefficient (i.e., coefficient of friction of rest) of about 0.45 to 0.48. With this arrangement, higher holding or adhesive forces and thus better machining performance can be achieved with the same clamping forces than would be possible by using flat supports. Since the clamping arrangement described herein would be used primarily for machining of surfaces of raw cast workpiece parts, the impressions which might be made in the undersurfaces of the workpieces as a result of using conical workpiece supports are permissible. It will be recognized, however, that workpiece supports having differently shaped upwardly facing support portions could be employed. Thus, prismatic surfaces could be used for round workpieces, or round or flat supports could be used for workpieces on which no impression, or only slight impressions, can be tolerated.

By using a platform formed as a perforated plate of the type shown in FIGS. 1 and 2, the workpiece supports 3a-c, or any other number of such supports, can be selectively inserted to correspond to the form of the workpiece and it is a simple matter to reproduce the locations of the support members for the same kind of workpiece once the original arrangement has been arrived at, even though workpieces of different shapes may be clamped onto the plate in intervening times. The reproducibility is faciliated by providing identification on the platform itself using letters 6 to identify the columns and numbers 7 to identify the rows of holes. Thus, the locations of the supports can be identified by a simple two element indication for each support, those in FIG. 2 being identified as 1E, 4A and 5G. It is also of advantage for shapes of workpieces recurring in small series to determine the position of the workpiece supports by plug-in patterns.

Whenever a numerical control is used for the processing of the workpiece, it is possible to store the coordinates for the support point to permit automation of the reproducibility. Thus, an automatic change of the workpiece supports during the changeover from a workpiece of one form to a workpiece of another form becomes possible as a result of corresponding inserted tools at the processing station of the machine.

FIG. 3 shows a further embodiment of a punctured plate in a partial plan view, the plate therein being provided with a plurality of round holes 12 and a plurality of elongated or oblong holes 13. A predetermined number of rows of round holes 12 is followed by an equal number of rows of elongated holes 13, every other row being displaced or offset by half of the distance 11 which defines the center-to-center spacing of the openings in either the row or column direction. In the example shown, eight rows of round holes are provided, these being followed by eight rows of elongated holes. Of each group of eight rows, four are displaced by half of the distance 11 relative to the other four rows, and as a result of which each column includes four round holes 12 which are followed by four elongated holes 13, the direction of elongation 14 being parallel with the column direction.

Again, the holes lie in row and column lines which are orthogonally related.

Figure 4:
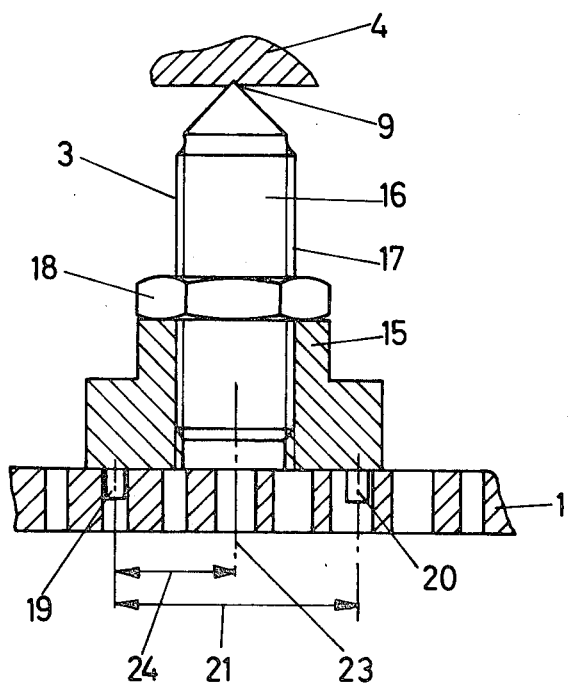
FIG. 4 is an enlarged side elevation, in partial section, of a workpiece support member usable with the plate of FIG. 3.

FIG. 4 shows a further embodiment of an adjustable workpiece support which is usable in conjunction with the plate shown in FIG. 3. As shown therein, the support member includes a base member 15 having a flat bottom surface with two downwardly extending pegs 19 and 20. The base member has an internally threaded bore having a central axis 23 perpendicular to the bottom surface. An externally threaded support body 16 having threads 17 is engaged in the bore and protrudes upwardly therefrom. Body 16 is surrounded by an internally threaded counter nut 18. The upwardly facing support surface 9, as previously described, is formed as a cone having a conic angle of 90°. As will be seen, the height of point 9 above the flat bottom surface of the base member can be adjusted by rotation of the body in the base member, the adjustment being lockable by threading nut 18 downwardly so that it abuts the upwardly facing surface of the base member.

Peg 19 can be inserted into one of the round holes 12, the spacing 21 between the centers of pegs 19 and 20 being such that the peg 20 can be inserted in an elongated hole 13 in plate 1. The center-to-center distance between pegs 19 and 20 is slightly greater than the distance 22 from the center of the first row of round holes 12 to the first row of the group of elongated holes 13 which distance, in the example shown, corresponds to four times the spacing 11 as shown in FIG. 3. The distance 24 from peg 19 to the middle 23 of the support member 3 corresponds to half the distance 22 or, in the example shown, to twice the distance 11.

As will be seen in FIG. 3, whenever peg 19 of the workpiece support is plugged into one of the round holes 12, the peg 20 can be inserted into an elongated hole 13 which lies along the same line 25, and the middle 23 of the support 3 lies in the middle of a hole 12 or 13. If, however, peg 20 is plugged into the next adjacent elongated hole 13' in the same row, then the middle of support 3, disposed on the slanting connecting line 26 in FIG. 3, lies centrally between four holes 12 and/or 13. As a result of this, it is possible to dispose the middle 23 of the workpiece support also on half the spacing 11 between holes which means that, for example in the case of a spacing 11 of 10 mm., a position of the workpiece support lying in the middle of the spacing 11, i.e., at a 5 mm. interval, may be selected. The length 27 of the elongated hole 13 is determined by these two possibilities of plugging in of the workpiece supports 3. In case of this variation of the embodiment of the perforated plate, it is possible with approximately only half the number of holes to achieve the same number of possibilities for the workpiece supporting points as compared with the first embodiment of the platform. As a result of the greater distance of the holes developing thereby, the perforated plate can be produced by stamping, which results in a considerable reduction of the cost of producing the perforated plate itself and this is achieved concurrently with the smaller number of holes.

The development of the platform as a punched plate in accordance with the invention, in the holes of which workpiece supports of selectable or adjustable level may be inserted, assures a simple and quick reproducibility of supporting points for different forms of workpieces and leads to much lower changover times. As a result of the good accessibility of the workpiece from several sides by a machining tool, the arrangement according to the invention is particularly suited for trimming of raw cast parts by means of a milling cutter, wherein, at the same time and as a result of the conical workpiece supports, high machining performances are possible with low clamping forces which insures an economical method of operation.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for supporting workpieces of various shapes and sizes on a platform for clamping with a clamping shoe comprising
    a substantially planar horizontal plate having a plurality of apertures therein in a predetermined array, said array including a plurality of rows and columns of apertures the centers of which lie along orthogonally disposed lines, the apertures in a first predetermined number of said rows being circular holes and the apertures in a second equal number of rows being elongated holes, the centers of the apertures in each of said rows and columns being uniformly spaced apart, the holes in alternating ones of said rows and columns being offset from the holes in adjacent rows and columns by one-half of the center-to-center spacing; and
    a plurality of workpiece support members each having two pegs insertable into selected ones of said apertures, downwardly facing shoulder means for resting on said plate adjacent the selected apertures, and an upwardly facing support portion for contacting and supporting a portion of the workpiece, the spacing between the centers of said pegs being greater than the center-to-center distance between the first circular hole and the first elongated hole in a column.

2. An apparatus according to claim 1 wherein the longer dimension of each of said elongated holes is selected such that, when one of said two pegs is inserted in a selected one of said round holes, the other of said pegs can be inserted into any one of three elongated holes lying in the same row as each other, the center one of said three elongated holes lying in the same column as said round hole.

3. An apparatus according to claim 1 wherein the longer dimension of each of said elongated holes is parallel to the lines in which said columns lie.

4. An apparatus according to claim 1 wherein said upwardly facing support portion comprises a conical surface having an included conic angle between about 90° and about 120°.

5. An apparatus according to claim 1 wherein said workpiece support members include a rotatable threaded connection means between said shoulder means and said upwardly facing support portion for adjusting the distance of said support portion above said plate when said peg is inserted into one of said apertures.

6. An apparatus according to claim 1 wherein each of said workpiece support members comprises
    a base member having a flat bottom surface defining said shoulder means and an upwardly facing surface, said pegs extending downwardly from said bottom surface;
    means in said base member defining an internally threaded bore having a central axis perpendicular to said bottom surface;
    an externally threaded support body in and protruding from said bore and engaging the threads thereof, the upper protruding end of said body defining said support portion; and
    an internally threaded nut surrounding and threadedly engaging said body, said nut having a lower surface abutting said upwardly facing surface of said base member.

7. An apparatus according to claim 1 wherein said plurality of workpiece support members includes members having support bodies of different lengths.

* * * * *